(12) United States Patent
Ham et al.

(10) Patent No.: US 9,821,665 B2
(45) Date of Patent: Nov. 21, 2017

(54) SAFETY APPARATUS FOR PORTABLE POWER GENERATION OF FUEL CELL VEHICLE AND OPERATION METHOD THEREOF

(71) Applicant: Hyundai Motor Company, Seoul (KR)

(72) Inventors: Keun Bong Ham, Seoul (KR); Chang Seok Ryu, Anyang-Gyeonggi-do (KR); Kyu Il Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 229 days.

(21) Appl. No.: 14/938,418

(22) Filed: Nov. 11, 2015

(65) Prior Publication Data
US 2016/0362010 A1    Dec. 15, 2016

(30) Foreign Application Priority Data

Jun. 15, 2015  (KR) .......................... 10-2015-0083877

(51) Int. Cl.
*B60L 11/18*        (2006.01)
*H01M 8/04858*      (2016.01)
*H01M 16/00*        (2006.01)

(52) U.S. Cl.
CPC .......... *B60L 11/18* (2013.01); *B60L 11/1883* (2013.01); *H01M 8/04925* (2013.01); *H01M 16/006* (2013.01); *H01M 2250/20* (2013.01); *H01M 2250/30* (2013.01); *Y02B 90/18* (2013.01); *Y02T 90/32* (2013.01); *Y02T 90/34* (2013.01)

(58) Field of Classification Search
CPC combination set(s) only.
See application file for complete search history.

(56) References Cited

U.S. PATENT DOCUMENTS

| 6,724,100 B1 | 4/2004 | Gabriel |
| 7,604,884 B2 * | 10/2009 | Imamura ........... H01M 8/04223 429/410 |
| 7,690,458 B2 * | 4/2010 | Ueda ......................... B03B 9/06 180/271 |

(Continued)

FOREIGN PATENT DOCUMENTS

| JP | 2002-165306 A | 6/2002 |
| JP | 2002-329519 A | 11/2002 |

(Continued)

*Primary Examiner* — An Luu
(74) *Attorney, Agent, or Firm* — Mintz Levin Cohn Ferris Glovsky and Popeo, P.C.; Peter F. Corless

(57) ABSTRACT

A safety apparatus for portable power generation of a fuel cell vehicle and an operation method thereof are provided. The safety apparatus includes a fuel cell that supplies power required for driving a motor of the fuel cell vehicle and a battery used as an auxiliary power source of the fuel cell. A bidirectional power converter adjusts input power and output power of the battery. A connection port connects to a portable power generator positioned extraneous to the fuel cell vehicle and a relay is connected to the connection port to adjust supplying of power to the portable power generator. A fuel cell controller determines whether a vehicle state satisfies a portable power generation mode entering condition when start-up of the fuel cell vehicle is turned on and operates the relay based on a confirmation result to perform portable power generation.

15 Claims, 6 Drawing Sheets

(56) References Cited

U.S. PATENT DOCUMENTS

| | | | |
|---|---|---|---|
| 8,501,360 B2 * | 8/2013 | Imai | B60L 11/1868 |
| | | | 429/428 |
| 2002/0172845 A1 | 11/2002 | Shimada et al. | |
| 2007/0023215 A1 | 2/2007 | Ueda | |
| 2007/0048569 A1 | 3/2007 | Fujita | |
| 2012/0109441 A1 | 5/2012 | Vespasien | |
| 2015/0057859 A1 | 2/2015 | Yamamoto et al. | |
| 2015/0303730 A1 | 10/2015 | Hoda et al. | |

FOREIGN PATENT DOCUMENTS

| | | |
|---|---|---|
| JP | 2004-349110 A | 12/2004 |
| JP | 2012-527211 A | 11/2012 |
| JP | 2013-001216 A | 1/2013 |
| JP | 2013-088866 A | 5/2013 |
| JP | 2013-179797 A | 9/2013 |
| JP | 2013-198282 A | 9/2013 |
| JP | 2014-009726 A | 1/2014 |
| JP | 2014-166084 A | 9/2014 |
| JP | 5727959 B2 | 6/2015 |
| KR | 20-1995-0011279 U | 5/1995 |
| KR | 10-1999-0047657 A | 7/1999 |
| KR | 10-2007-0024395 A | 3/2007 |
| KR | 2013-0072876 A | 7/2013 |
| KR | 2015-0075201 A | 7/2015 |
| KR | 10-2015-0143922 A | 12/2015 |
| KR | 10-2016-0072975 A | 6/2016 |

\* cited by examiner

SAFETY APPARATUS FOR PORTABLE POWER GENERATION OF FUEL CELL VEHICLE AND OPERATION METHOD THEREOF

CROSS-REFERENCE TO RELATED APPLICATION

This application is based on and claims the benefit of priority to Korean Patent Application No. 10-2015-0083877, filed on Jun. 15, 2015 in the Korean Intellectual Property Office, the disclosure of which is incorporated herein in its entirety by reference.

TECHNICAL FIELD

The present disclosure relates to a safety apparatus for portable power generation of a fuel cell vehicle capable of preventing an accident that may occur due to movement of the fuel cell vehicle when power of the fuel cell vehicle is used as emergency power of a portable power generator present extraneous to the fuel cell vehicle, and an operation method thereof.

BACKGROUND

In accordance with an increase in an interest in environmental pollution, research into environmentally-friendly energy sources has been actively conducted. Particularly, a fuel cell system using a fuel cell generating power by an electrochemical reaction between a fuel gas and an oxidizing gas as an energy source has been prominent. In addition, a fuel cell vehicle in which the fuel cell system is mounted has become an important subject of study as the next-generation transport means In the fuel cell vehicle, an electric motor of the fuel cell vehicle is driven using power produced in the fuel cell.

When a portable power generator is connected to the fuel cell vehicle during an emergency such as a disaster, or the like, the fuel cell vehicle may serve as a power supply configured to supply emergency power to the portable power generator. However, since the fuel cell vehicle is a means for transporting persons and/or cargo, when the fuel cell vehicle moves and is connected to the portable power generator, a safety risk may occur.

SUMMARY

The present disclosure provides a safety apparatus for portable power generation of a fuel cell vehicle capable of preventing an accident that may occur due to movement of the fuel cell vehicle by limiting a manipulation of a shifting lever of the fuel cell vehicle and driving of a motor when power of the fuel cell vehicle is used as emergency power of a portable power generator present extraneous to the fuel cell vehicle, and an operation method thereof.

According to an exemplary embodiment of the present disclosure, a safety apparatus for portable power generation of a fuel cell vehicle may include: a fuel cell configured to supply power required for driving a motor of the fuel cell vehicle; a battery configured to be used as an auxiliary power source of the fuel cell; a bidirectional power converter configured to control input power and output power of the battery, a connection port configured to connect a portable power generator positioned extraneous to the fuel cell vehicle; a relay configured to be connected to the connection port to supply power to the portable power generator; and a fuel cell controller configured to confirm whether a vehicle state satisfies a portable power generation mode entering condition when start-up of the fuel cell vehicle is turned on and adjust the relay based on a confirmation result to perform portable power generation.

The connection port may include: a pair of power terminals configured to supply operation power of the portable power generator; a connection signal terminal configured to supply low voltage power to the portable power generator and transfer a connection signal used for sensing a connection state of the portable power generator; a connection sensing terminal configured to receive a feedback of the connection signal; and a ground terminal The relay may be positioned between the pair of power terminals and the fuel cell and the bidirectional power converter. The fuel cell controller may be configured to limit a manipulation of a shifting lever and stop a torque command for driving the motor when an operation mode of the fuel cell vehicle enters a portable power generation mode. Additionally, the fuel cell controller may be configured to supply power of the fuel cell and power of the battery to the portable power generator in a portable power generation mode.

The fuel cell controller may then be configured to stop the portable power generation when an operation mode of the fuel cell vehicle is changed from a portable power generation mode into an electric vehicle (EV) mode. The fuel cell controller may be configured to stop supplying the power to the portable power generator when the start-up of the fuel cell vehicle is turned off in a portable power generation mode. Further, the fuel cell controller may be configured to stop supplying the power to the portable power generator when a portable power generation stopping command is received in a portable power generation mode and stop supplying the power to the portable power generator when the connection of the connection port is released in the portable power generation mode.

According to another exemplary embodiment of the present disclosure, an operation method of a safety apparatus for portable power generation of a fuel cell vehicle may include: confirming whether a vehicle state satisfies a portable power generation mode entering condition when start-up of the fuel cell vehicle is turned on; allowing an operation mode of the fuel cell vehicle to enter a portable power generation mode when the vehicle state satisfies the portable power generation mode entering condition; limiting a manipulation of a shifting lever and driving of a motor of the fuel cell vehicle when the operation mode of the fuel cell vehicle enters the portable power generation mode; and supplying power to a portable power generator positioned extraneous to the fuel cell vehicle using a fuel cell and a battery when the manipulation of the shifting lever and the driving of the motor of the fuel cell vehicle are limited.

In the determination (e.g., confirmation) of whether the vehicle state satisfies the portable power generation mode entering condition, a position of the shifting lever may be confirmed, whether a connection port is connected may be determined, and whether a portable power generation command is received may be determined. The operation method of a safety apparatus for portable power generation of a fuel cell vehicle may further include: changing the operation mode of the fuel cell vehicle from the portable power generation mode into an EV mode; and stopping the supply of the power to the portable power generator when the operation mode of the fuel cell vehicle enters the EV mode.

The operation method of a safety apparatus for portable power generation of a fuel cell vehicle may further include stopping the supply of the power to the portable power generator when the start-up of the fuel cell vehicle is turned off in the portable power generation mode. Additionally, the operation method of a safety apparatus for portable power generation of a fuel cell vehicle may include: sensing a release of a connection to the portable power generator in the portable power generation mode; and stopping the supply of the power to the portable power generator when the connection to the portable power generator is released. A portable power generation stopping command may also be received in the portable power generation mode; and the supply of power to the portable power generator may be stopped when the portable power generation stopping command is received.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
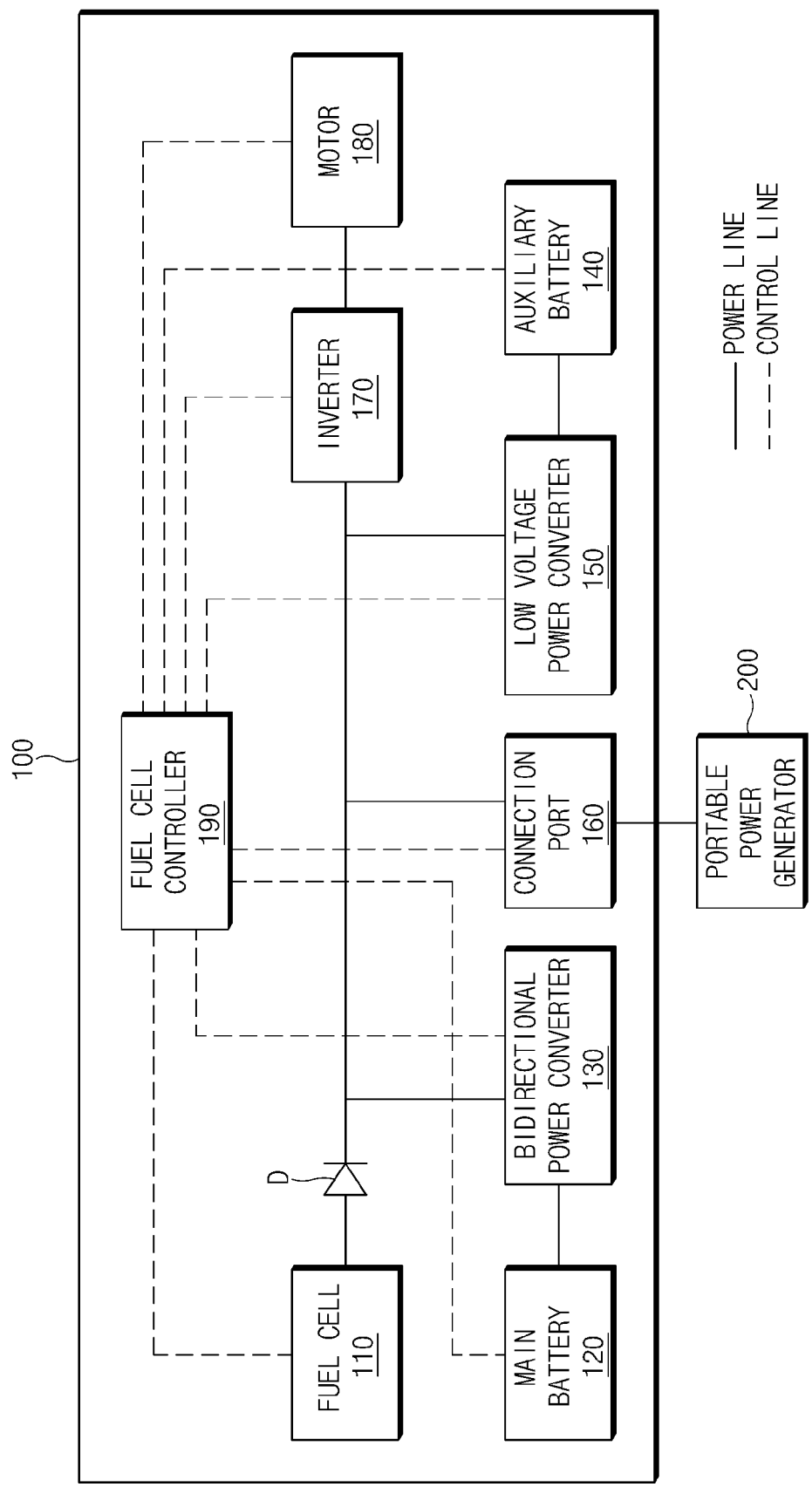
FIG. 1 is a block diagram illustrating a safety apparatus for portable power generation of a fuel cell vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. The present disclosure is to limit movement of a fuel cell vehicle to prevent a safety problem occurring due to movement of the fuel cell vehicle when power produced in a fuel cell of the fuel cell vehicle is supplied as emergency power of a portable power generator.

Figure 2:
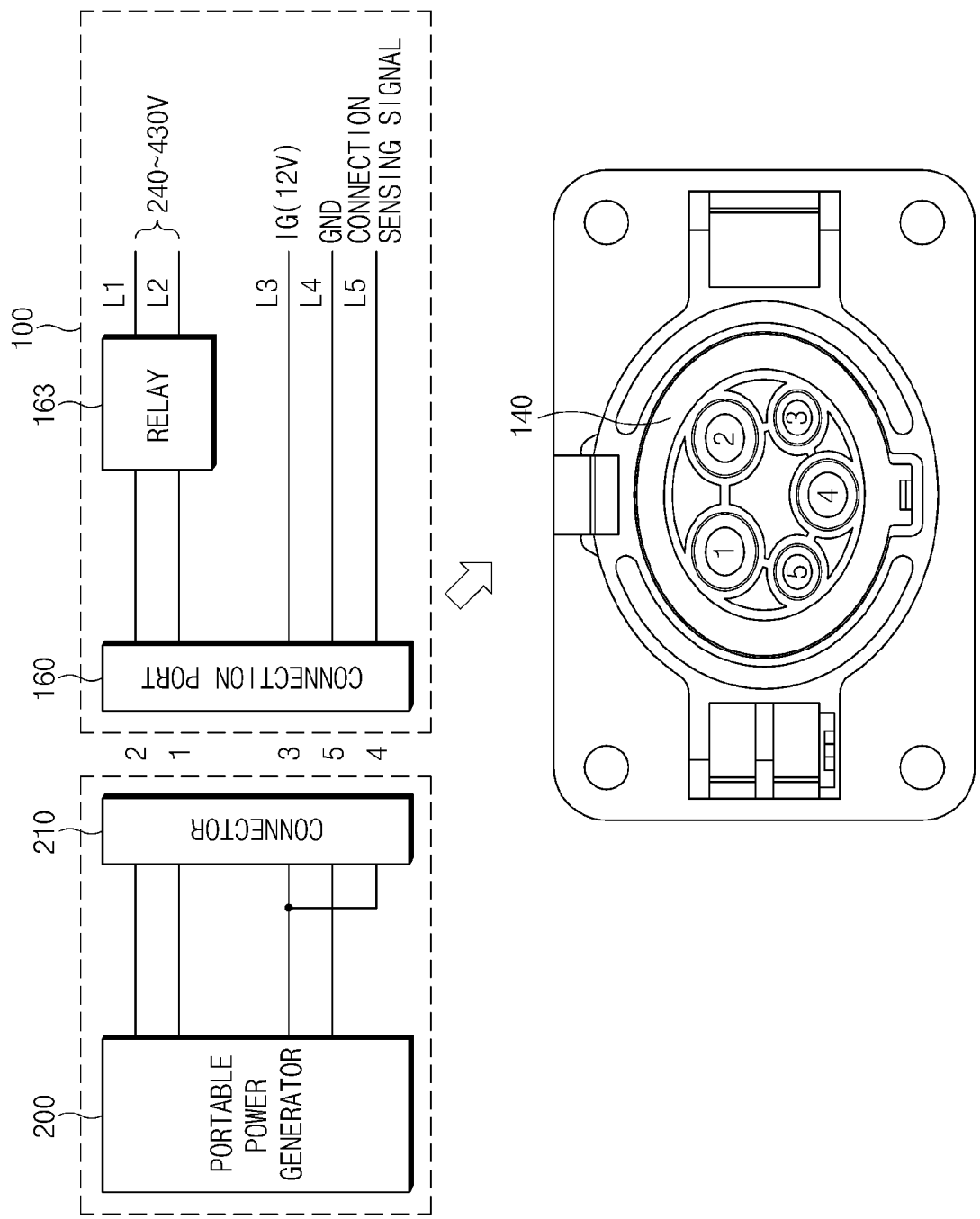
FIG. 2 is a view illustrating structures of a connection port illustrated in FIG. 1 and a connector of a portable power generator according to an exemplary embodiment of the present disclosure.

FIG. 1 is a block diagram illustrating a safety apparatus for portable power generation of a fuel cell vehicle according to an exemplary embodiment of the present disclosure, and FIG. 2 is a view illustrating structures of a connection port illustrated in FIG. 1 and a connector of a portable power generator.

The safety apparatus 100 mounted within the fuel cell vehicle may be configured to limit movement of the fuel cell vehicle during portable power generation of the fuel cell vehicle, thereby protecting a worker from an accident due to carelessness. The safety apparatus 100 may include a fuel cell 110, a main battery 120, a bidirectional power converter 130, an auxiliary battery 140, a low voltage power converter 150, a connection port 160, an inverter 170, a motor 180, and a fuel cell controller 190. The fuel cell controller 190 may be configured to operate the various components of the safety apparatus 100.

In particular, the fuel cell 110 allows oxygen and hydrogen to chemically react to each other to product electric energy (power). A diode D may be connected to an output terminal of the fuel cell 110 to protect the fuel cell 110 from a reverse current. The main battery 120 may be configured to store the electric energy therein (e.g., may be charged with the electric energy) or emit (e.g., discharge) the electric energy stored therein. The main battery 120 may be formed of a high voltage battery. The fuel cell 110 and the main battery 120 may be configured to supply power required for driving the motor of the fuel cell vehicle. The fuel cell 110 may be used as a main power source of the fuel cell vehicle, and the main battery 120 may be used as an auxiliary power source.

The bidirectional power converter 130 may be configured to adjust output power output from the main battery 120 or input power input to the main battery 120. The bidirectional power converter 130 may be implemented by a bidirectional high voltage direct current (DC) to DC converter (BHDC). The bidirectional power converter 130 may be configured to convert a voltage output from the main battery 120 into a voltage required for driving the motor and transfer the converted voltage to the inverter 170. The bidirectional power converter 130 may further be configured to convert an input voltage input to the main battery 120 into a charging voltage required for charging the main battery 120.

The auxiliary battery 140 may be configured to store low voltage (e.g., about 12.5 to 14V) power therein (e.g., may be charged with the low voltage power) or emit (e.g., discharge) the power stored therein. The auxiliary battery 140 may be configured to supply the power to a low voltage load mounted within the fuel cell vehicle. The low voltage load may be a sheet hot wire, a room lamp, and the like. The low voltage power converter 150 may be configured to convert a high voltage (e.g., about 240 to 430V) provided from the fuel cell 110 or the main battery 120 into a low voltage and charge the auxiliary battery 140 with the low voltage.

The connection port 160 is an interface for connection to a portable power generator 200 positioned extraneous to the fuel cell vehicle. The fuel cell vehicle may be configured to supply power (e.g., emergency power) to the portable power generator 200 through the connection port 160. The connection port 160 may include five terminals 1 to 5 and a relay 163, as illustrated in FIG. 2. However, the connection port 160 is not limited to five terminals, and may include any number of terminals. The connection port 160 may include a pair of power terminals 1 and 2, a connection signal terminal 3, a connection sensing terminal 5, and a ground terminal 4. The power terminals 1 and 2 may be connected to a pair of high voltage power lines L1 and L2 configured to supply operation power of the portable power generator 200. The high voltage power lines L1 and L2 may be connected to output terminals to the fuel cell 110 and the bidirectional power converter 130.

The relay 163 configured to execute the supplying and the blocking of the power to the portable power generator 200 may be installed on the high voltage power lines L1 and L2. The relay 163, which connects the portable power generator 200 and the power of the fuel cell vehicle to each other, may be turned on when an operation mode of the fuel cell vehicle enters a portable power generation mode. The connection signal terminal 3 may be connected to a connection signal line L3 in which a connection signal used for sensing a connection state of the connection port 160 flows. The connection signal line L3 may be a low voltage power line connected to an output terminal of the low voltage power converter 150 to supply the low voltage power output from the auxiliary battery 140. In other words, the connection signal terminal 3 may be a terminal configured to supply the lower voltage power.

Further, the ground terminal 4 may be connected to a ground line L4. The connection sensing terminal 5 may be connected to a feedback signal line L5 in which a feedback signal (e.g., a connection sensing signal) of the connection signal flows. The inverter 170 may be configured to convert high voltage DC power supplied from the fuel cell 110 and/or the main battery 120 into power required for driving the motor. For example, the inverter 170 may be configured to convert a high voltage output from the fuel cell 110 and/or the main battery 120 into a three-phase alternating current (AC) voltage. The motor 180 may be an electric motor driven by receiving the power supplied through the inverter 170.

The fuel cell controller 190 may be configured to determine (e.g., confirm) whether a vehicle state satisfies a portable power generation mode entering condition when start-up of the fuel cell vehicle is turned on. The fuel cell controller 190 may then be configured to collect vehicle state information using sensors and electronic control apparatuses mounted within the fuel cell vehicle. The vehicle state information may include position information of a shifting lever, input information of a portable power generation button, and connection state information of the connection port 160. In particular, the portable power generation button is an input through which a user command for instructing a portable power generation operation may be received.

The fuel cell controller 190 may be configured to change the operation mode of the fuel cell vehicle to the portable power generation mode when the fuel cell vehicle is in a parked state (e.g., a shifting lever is positioned at a parking (P) stage), a connection of the connection port 160 may be sensed, and a portable power generation operation command (e.g., a portable power generation button is in a turn-on state) may be received. In other words, the fuel cell controller 190 may be configured to determine whether the shifting lever is positioned at the P stage, the feedback of the connection signal is sensed, and the portable power generation button is in the turn-on state for the vehicle state to satisfy the portable power generation mode entering condition.

Furthermore, the fuel cell controller 190 may be configured to limit a manipulation of the shifting lever and driving of the motor 180 when the operation mode of the fuel cell vehicle enters the portable power generation mode. In other words, the fuel cell controller 190 may be configured to turn off a shifting lever lock relay to prevent the shifting lever from being manipulated, and stop a torque command for driving the motor to prevent the motor 180 from being driven. For example, the fuel cell controller 190 may be configured to stop the torque command even though the shifting lever is shifted to a drive (D) stage after the connection of the connection port 160 is sensed while stopping (e.g., a shifting lever of a P stage) the fuel cell vehicle in a vehicle driving mode. The fuel cell controller 190 may be configured to change the operation mode of the fuel cell vehicle to enter the portable power generation mode when a release of the connection of the connection port 160 is sensed, and maintain the stop of the torque command until before the start-up of the fuel cell vehicle is turned off.

The fuel cell controller 190 may further be configured to change the operation mode of the fuel cell vehicle into an electric vehicle (EV) mode when an abnormality (e.g., a failure or error) is generated in the fuel cell 110 in the portable power generation mode. Particularly, the EV mode indicates a mode in which only the main battery 120 may be used. The fuel cell controller 190 may be configured to turn off the relay 163 which connects the portable power generator 200 and the power of the fuel cell vehicle while changing the operation mode of the fuel cell vehicle into the EV mode. In other words, the fuel cell controller 190 may be configured to stop supplying the power to the portable power generator 200. In addition, the fuel cell controller 190 may be configured to execute a shutdown sequence to prevent the main battery 120 from be discharged, thereby stopping the driving (e.g., start-up) of the fuel cell vehicle.

Additionally, the fuel cell controller 190 may be configured to turn off the relay 163 and then execute the shutdown sequence, when the start-up of the fuel cell vehicle is turned off in the portable power generation mode. In other words, the fuel cell controller 190 may be configured to stop an operation of the fuel cell 110 and also stop the driving of the fuel cell vehicle. Further, the fuel cell controller 190 may be configured to turn off the relay 163 and execute the shutdown sequence, when a portable power generation stopping command is received in the portable power generation mode or the connection of the connection port 160 is released. In other words, the fuel cell controller 190 may be configured to turn off the relay 163 and then stop the fuel cell 110 and also stop the driving of the fuel cell vehicle, when the portable power generation button is changed into a turn-off state by the user or the connection signal is not fed back.

The fuel cell controller 190 may then be configured to change and display a power gauge displayed on a cluster based on the operation mode of the fuel cell vehicle. In other words, the fuel cell controller 190 may be configured to calculate power generation power of the fuel cell and display the calculated power generation power as the power gauge on the cluster when the operation mode of the fuel cell vehicle is the portable power generation mode. Additionally, the fuel cell controller 190 may be configured to calculate motor driving power and display the motor driving power as the power gauge when the operation mode of the fuel cell vehicle is the vehicle driving mode.

The portable power generator 200 may be positioned extraneous to the fuel cell vehicle, and increase or decrease and output the power generated in the fuel cell vehicle through a connector 210. The connector 210 may connect the portable power generator 200 to the connection port 160 of the fuel cell vehicle. When the connector 210 is connected to the connection port 160, the electric energy produced in the fuel cell 110 of the fuel cell vehicle may be supplied as driving power of the portable power generator 200.

Figure 3:
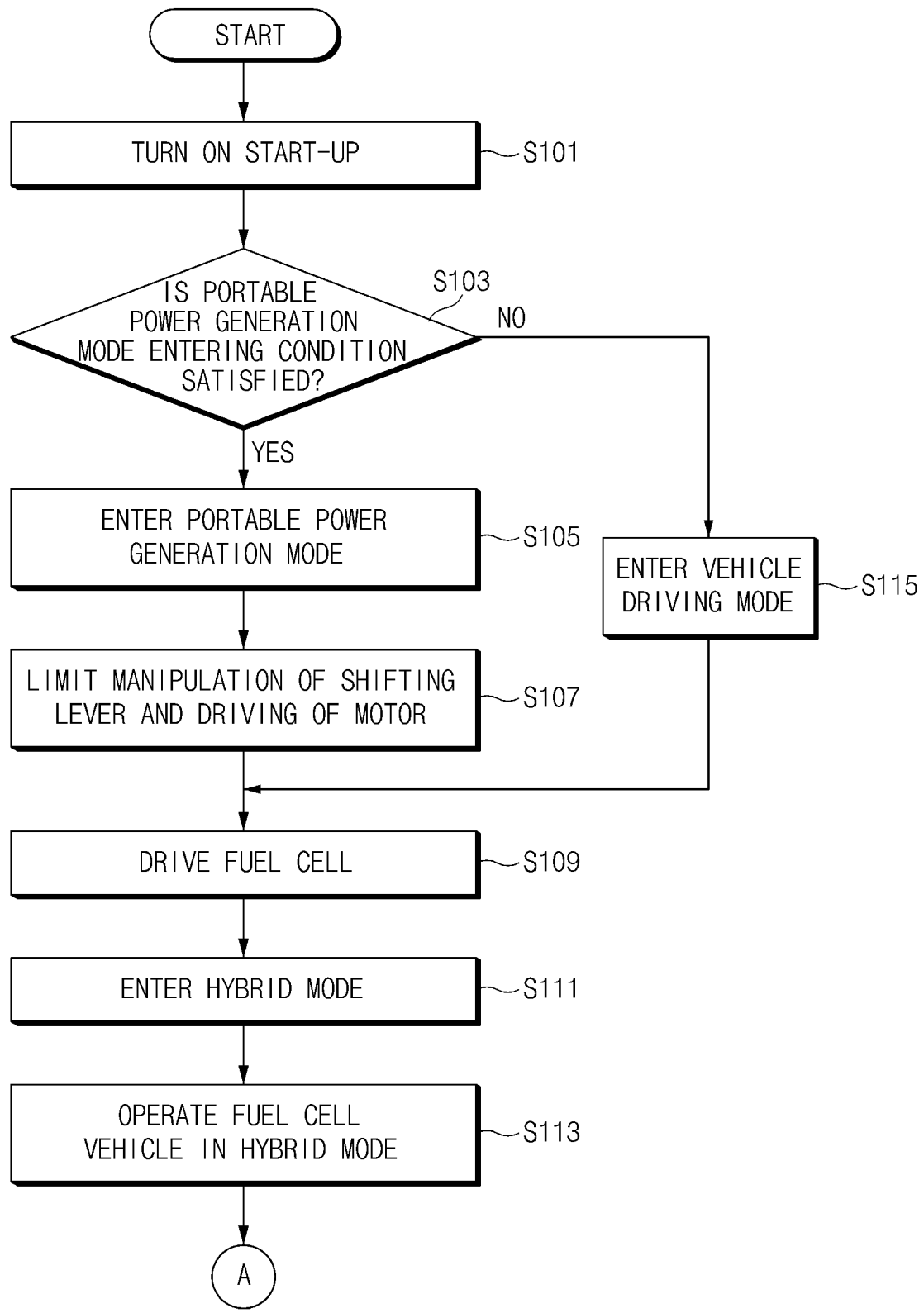
FIG. 3 is a flow chart illustrating an operation method of a safety apparatus for portable power generation of a fuel cell vehicle according to an exemplary embodiment of the present disclosure.

FIG. 3 is a flow chart illustrating an operation method of a safety apparatus for portable power generation of a fuel cell vehicle according to an exemplary embodiment of the present disclosure. The method described herein below may be executed by a controller having a memory and a processor. Referring to FIG. 3, the fuel cell controller 190 may be configured to determine whether the vehicle state satisfies the portable power generation mode entering condition when the start-up of the fuel cell vehicle is turned on (S101 and S103). The portable power generation mode entering condition may be whether the shifting lever is positioned at the P stage and whether the connection signal of the connection port 160 and a portable power generation button signal are sensed.

The fuel cell controller 190 may then be configured to change the operation mode of the fuel cell vehicle to enter the portable power generation mode (S105) when the vehicle state satisfies the portable power generation mode entering condition. The fuel cell controller 190 may also be configured to change the operation mode of the fuel cell vehicle to enter the portable power generation mode when the fuel cell vehicle is in the parked state (e.g., the shifting lever is positioned at the P stage) and the connection of the connection port 160 and an input (e.g., the portable power generation button is turned on) of the portable power generation button are sensed.

The fuel cell controller 190 may be configured to limit the manipulation of the shifting lever and the driving of the motor when the operation mode of the fuel cell vehicle enters the portable power generation mode (S107). In particular, the fuel cell controller 190 may be configured to change the shifting lever lock relay into a turn-off state to prevent the shifting lever from being manipulated, and stop the torque command for driving the motor 180. The fuel cell controller 190 may be configured to turn on a battery relay and operate the bidirectional power converter 130 to operate the main battery 120 to supply the power and drive the fuel cell 110 (S109). In other words, the fuel cell controller 190 may be configured to drive the fuel cell 110 in the EV mode to allow the fuel cell vehicle to use both of the power of the fuel cell 110 and the power of the main battery 120.

The fuel cell controller 190 may be configured to change the operation mode of the fuel cell vehicle to enter a hybrid mode in which the power output from the fuel cell 110 and the main battery 120 may be used (S111). In other words, the fuel cell controller 190 may be configured to convert the operation mode of the fuel cell vehicle into the hybrid mode. The fuel cell controller 190 may further be configured to change the operation mode of the fuel cell vehicle to enter the hybrid mode to supply the power output from the fuel cell 110 and the main battery 120 to the portable power generator 200. In other words, the fuel cell controller 190 may be configured to execute the portable power generation. In particular, the fuel cell controller 190 may be configured to calculate the power of the fuel cell 110 and display the power gauge on the cluster (not illustrated). The power gauge may be output in any one or more of forms such as a numeral form, an image form, an audio form, and the like.

Meanwhile, the fuel cell controller 190 may be configured to change the operation mode of the fuel cell vehicle to enter the vehicle driving mode (S115) when the vehicle state does not satisfy the portable power generation mode entering condition. The fuel cell controller 190 may be configured to operate (e.g., drive) the motor using the power output from the fuel cell 110 and the main battery 120 to drive the fuel cell vehicle. Particularly, the fuel cell controller 190 may be configured to calculate the motor power and display the power gauge on the cluster.

Figure 4:
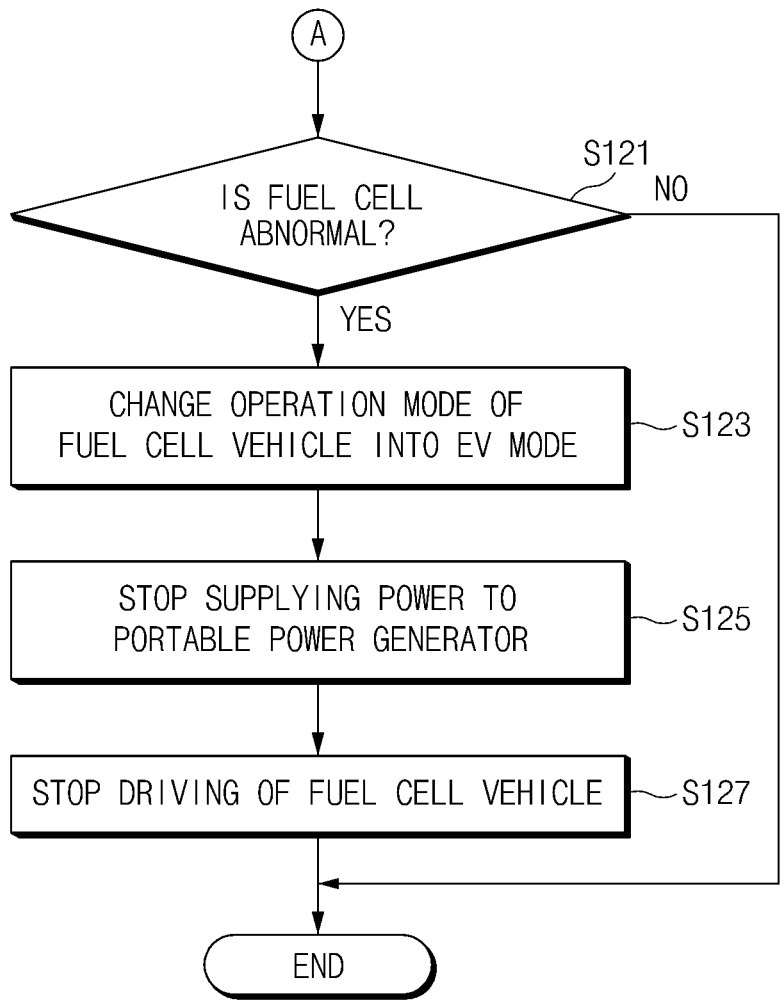
FIG. 4 is a flow chart for describing an operation of a safety apparatus at the time of being changed into an electric vehicle (EV) mode according to an exemplary embodiment of the present disclosure.

FIG. 4 is a flow chart for describing an operation of a safety apparatus at the time of being changed into an EV mode according to an exemplary embodiment of the present disclosure. In the present exemplary embodiment, when the supply of the power from the fuel cell 110 is stopped due to abnormity of a fuel cell system during a period in which the fuel cell vehicle is operated in the hybrid mode, such that the operation mode is changed into the EV mode when the high voltage battery 120 may be used will be described by way of example.

The fuel cell controller 190 may be configured to change the operation mode of the fuel cell vehicle to enter the portable power generation mode and then change the operation mode of the fuel cell vehicle to enter the hybrid mode in which the fuel cell 110 and the main battery 120 are used, thereby performing the portable power generation, as illustrated in FIG. 3. The fuel cell controller 190 may then be configured to determine whether abnormity is generated in the fuel cell 110 when the fuel cell vehicle is operated in the hybrid mode (S121). The fuel cell controller 190 may be configured to change an operation mode of the safety apparatus 100 from the hybrid mode into the EV mode (S123) when the abnormality (e.g., failure, error, etc.) is generated in the fuel cell 110.

The fuel cell controller 190 may be configured to stop the power supplied to the portable power generator 200 (S125) when the operation mode of the safety apparatus 100 is changed into the EV mode. In other words, the fuel cell controller 190 may be configured to turn off the relay 163 to block the power connected to the portable power generator 200, when the operation mode of the safety apparatus 100 is changed into the EV mode. The fuel cell controller 190 may further be configured to stop the supply of the power to the portable power generator 200 and stop the driving of the fuel cell vehicle (S125).

As described above, the safety apparatus 100 for portable power generation of a fuel cell vehicle according to the present exemplary embodiment may change the operation mode thereof into the EV mode in which the high voltage battery 120 is used as a power supply and stop the portable power generation, when the power generation of the fuel cell 110 is stopped due to the abnormality of the fuel cell system in the portable power generation mode.

Figure 5:
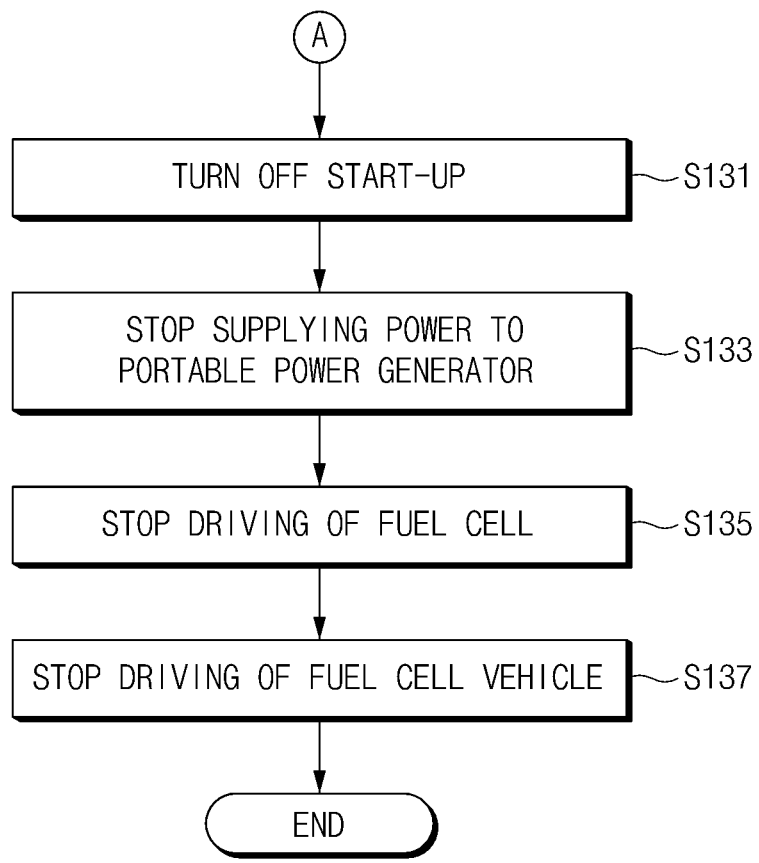
FIG. 5 is a flow chart for describing an operation of a safety apparatus in a start-up turn-off state according to an exemplary embodiment of the present disclosure.

FIG. 5 is a flow chart for describing an operation of a safety apparatus in a start-up turn-off state according to an exemplary embodiment of the present disclosure. The fuel cell controller 190 may be configured to sense a turn-off of the start-up of the fuel cell vehicle while performing the portable power generation in the hybrid mode (S131). The fuel cell controller 190 may be configured to stop supplying the power to the portable power generator 200 (S133) when the start-up of the fuel cell vehicle is turned off. Then, the fuel cell controller 190 may be configured to stop driving of the fuel cell 110 (S135), and also stop the driving of the fuel cell vehicle (S137).

Figure 6:
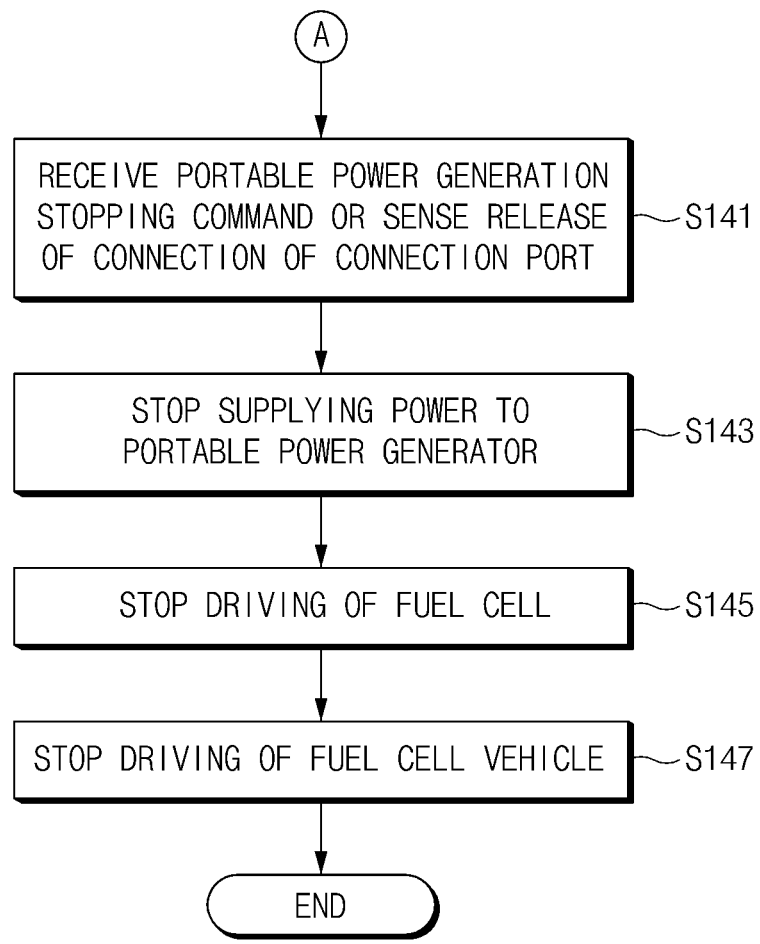
FIG. 6 is a flow chart for describing an operation of a safety apparatus based on a portable power generation stopping request according to an exemplary embodiment of the present disclosure.

FIG. 6 is a flow chart for describing an operation of a safety apparatus based on a portable power generation stopping request according to an exemplary embodiment of the present disclosure. The fuel cell controller 190 may be configured to receive a portable power generation stopping command or sense the release of the connection of the connection port 160 while performing the portable power generation in the hybrid mode (S141). In other words, when the portable power generation button is in a turn-off state or the connector 210 of the portable power generator 200 connected to the connection port 160 is disconnected from the connection port 160 by a user manipulation, the fuel cell controller 190 may be configured to sense that the turn-off state or the disconnection of the connector 210 from the connection port 160.

The fuel cell controller 190 may then be configured to stop the power supplied to the portable power generator 200 (S143) when the portable power generation stopping command is received or the release of the connection of the connection port 160 is sensed. In other words, the fuel cell controller 190 may be configured to turn off the relay 163 that executes the power connection between the fuel cell 110 of the fuel cell vehicle and the portable power generator 200 when the power generation stopping request is received from the driver. Then, the fuel cell controller 190 may be configured to stop the driving of the fuel cell and the driving of the fuel cell vehicle (S145 and S147). In other words, the fuel cell controller 190 may be configured to stop production of the power of the fuel cell 110 and stop the start-up of the fuel cell vehicle.

As described above, according to an exemplary embodiment of the present disclosure, when the power produced in the fuel cell of the fuel cell vehicle is supplied as the emergency power of the portable power generator present extraneous to the fuel cell vehicle, the manipulation of the shifting lever and the driving of the motor of the fuel cell vehicle may be limited to prevent the fuel cell vehicle from moving, thereby making it possible to prevent an accident that may occur due to the movement of the fuel cell vehicle. Therefore, the safety apparatus according to an exemplary embodiment of the present disclosure may protect the driver and an operator of the portable power generator from the accident.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A safety apparatus for portable power generation of a fuel cell vehicle, comprising:
   a fuel cell configured to supply power required for driving a motor of the fuel cell vehicle;
   a battery configured to be used as an auxiliary power source of the fuel cell;
   a bidirectional power converter configured to adjust input power and output power of the battery;
   a connection port configured to connect to a portable power generator positioned extraneous to the fuel cell vehicle;
   a relay configured to be connected to the connection port to adjust the supplying of power to the portable power generator; and
   a fuel cell controller configured to determine whether a vehicle state satisfies a portable power generation mode entering condition when start-up of the fuel cell vehicle is turned on and operate the relay based on a confirmation result to perform portable power generation.

2. The safety apparatus for portable power generation of a fuel cell vehicle according to claim 1, wherein the connection port includes:
   a pair of power terminals configured to supply operation power of the portable power generator;
   a connection signal terminal configured to supply low voltage power to the portable power generator and transfer a connection signal used for sensing a connection state of the portable power generator;
   a connection sensing terminal configured to receive a feedback of the connection signal; and
   a ground terminal.

3. The safety apparatus for portable power generation of a fuel cell vehicle according to claim 2, wherein the relay is positioned between the pair of power terminals and the fuel cell and the bidirectional power converter.

4. The safety apparatus for portable power generation of a fuel cell vehicle according to claim 1, wherein the fuel cell controller is configured to limit a manipulation of a shifting lever and stop a torque command for driving the motor when an operation mode of the fuel cell vehicle enters a portable power generation mode.

5. The safety apparatus for portable power generation of a fuel cell vehicle according to claim 1, wherein the fuel cell controller is configured to supply power of the fuel cell and power of the battery to the portable power generator in a portable power generation mode.

6. The safety apparatus for portable power generation of a fuel cell vehicle according to claim 1, wherein the fuel cell controller is configured to stop the portable power generation when an operation mode of the fuel cell vehicle is changed from a portable power generation mode into an electric vehicle (EV) mode.

7. The safety apparatus for portable power generation of a fuel cell vehicle according to claim 1, wherein the fuel cell controller is configured to stop supplying the power to the portable power generator when the start-up of the fuel cell vehicle is turned off in a portable power generation mode.

8. The safety apparatus for portable power generation of a fuel cell vehicle according to claim 1, wherein the fuel cell controller is configured to stop supplying the power to the portable power generator when a portable power generation stopping command is received in a portable power generation mode.

9. The safety apparatus for portable power generation of a fuel cell vehicle according to claim 1, wherein the fuel cell controller is configured to stop supplying the power to the portable power generator when the connection of the connection port is released in the portable power generation mode.

10. An operation method of a safety apparatus for portable power generation of a fuel cell vehicle, comprising:
    determining, by a controller, whether a vehicle state satisfies a portable power generation mode entering condition when start-up of the fuel cell vehicle is turned on;
    changing, by the controller, an operation mode of the fuel cell vehicle to enter a portable power generation mode when the vehicle state satisfies the portable power generation mode entering condition;
    limiting, by the controller, a manipulation of a shifting lever and driving of a motor of the fuel cell vehicle when the operation mode of the fuel cell vehicle enters the portable power generation mode; and
    supplying, by the controller, power to a portable power generator positioned extraneous to the fuel cell vehicle using a fuel cell and a battery when the manipulation of the shifting lever and the driving of the motor of the fuel cell vehicle are limited.

11. The operation method of a safety apparatus for portable power generation of a fuel cell vehicle according to claim 10, wherein in the determination of whether the vehicle state satisfies the portable power generation mode entering condition, a position of the shifting lever is determined, whether a connection port is connected is determined, and whether a portable power generation command is received is determined.

12. The operation method of a safety apparatus for portable power generation of a fuel cell vehicle according to claim 10, further comprising:
    changing, by the controller, the operation mode of the fuel cell vehicle from the portable power generation mode into an electric vehicle (EV) mode; and
    stopping, by the controller, the supply of the power to the portable power generator when the operation mode of the fuel cell vehicle enters the EV mode.

13. The operation method of a safety apparatus for portable power generation of a fuel cell vehicle according to claim 10, further comprising:
    stopping, by the controller, the supply of the power to the portable power generator when the start-up of the fuel cell vehicle is turned off in the portable power generation mode.

14. The operation method of a safety apparatus for portable power generation of a fuel cell vehicle according to claim 10, further comprising:
    sensing, by the controller, a release of a connection to the portable power generator in the portable power generation mode; and
    stopping, by the controller, the supply of the power to the portable power generator when the connection to the portable power generator is released.

15. The operation method of a safety apparatus for portable power generation of a fuel cell vehicle according to claim 10, further comprising:
    receiving, by the controller, a portable power generation stopping command in the portable power generation mode; and
    stopping, by the controller, the supply of the power to the portable power generator when the portable power generation stopping command is received.

* * * * *